United States Patent [19]
Taylor et al.

[11] Patent Number: 5,794,756
[45] Date of Patent: Aug. 18, 1998

[54] ARTICLE CONVEYOR AND COLLATOR SYSTEM AND METHOD

[75] Inventors: James L. Taylor, Arlington; Johnny A. Alanis, Duncanville; Mark S. Boswell, Grand Prairie, all of Tex.

[73] Assignee: Project Services Group, Inc., Dallas, Tex.

[21] Appl. No.: 614,169

[22] Filed: Mar. 8, 1996

[51] Int. Cl.⁶ ................................................ B65G 25/00
[52] U.S. Cl. ................................................ 198/429; 198/433
[58] Field of Search .................................... 198/429, 432, 198/433, 597, 426

[56]     References Cited

U.S. PATENT DOCUMENTS

| | | | |
|---|---|---|---|
| 3,386,557 | 6/1968 | Ross et al. | 198/30 |
| 3,655,180 | 4/1972 | Holler | 198/429 X |
| 3,758,104 | 9/1973 | Daily | 271/75 |
| 4,250,688 | 2/1981 | Lingenfelder | 53/438 |
| 4,699,262 | 10/1987 | Nakano et al. | 198/411 |
| 4,756,400 | 7/1988 | Funo et al. | 198/425 |
| 4,768,642 | 9/1988 | Hunter | 198/425 |
| 5,082,103 | 1/1992 | Ross et al. | 198/460 |
| 5,092,450 | 3/1992 | Schommartz et al. | 198/460 |
| 5,127,209 | 7/1992 | Hunter | 53/439 |
| 5,191,963 | 3/1993 | Delsanto | 198/429 |

*Primary Examiner*—James R. Bidwell
*Attorney, Agent, or Firm*—Akin, Gump, Strauss, Hauer & Feld, L.L.P.

[57]     ABSTRACT

A conveyor system useful for conveying food packages from a packaging machine includes a first conveyor for receiving the packages seriatim and conveying the packages toward a second conveyor. The first conveyor includes sensors and ejection mechanism for ejecting packages which are too long, attached to each other or of insufficient weight. A sensor at the discharge end of the first conveyor controls operation of an indexable second conveyor having a conveyor member with spaced apart partitions defining slots for receiving each package. The system includes a transfer mechanism comprising a rake mounted above the second conveyor on a linear bearing assembly with a rack and pinion drive and a pneumatic actuator for lowering, translating, retracting and returning the rake to a starting position. The third conveyor includes an endless conveyor belt connected to a drive motor which operates in timed relationship to the transfer mechanism to transfer laterally spaced rows of packages from the second conveyor. A control system counts the number of packages disposed on the second conveyor, controls the operation of a drive motor for the second conveyor and actuates the transfer mechanism and the third conveyor in response to a predetermined number of packages being in position to be transferred from the second conveyor to the third conveyor.

22 Claims, 9 Drawing Sheets

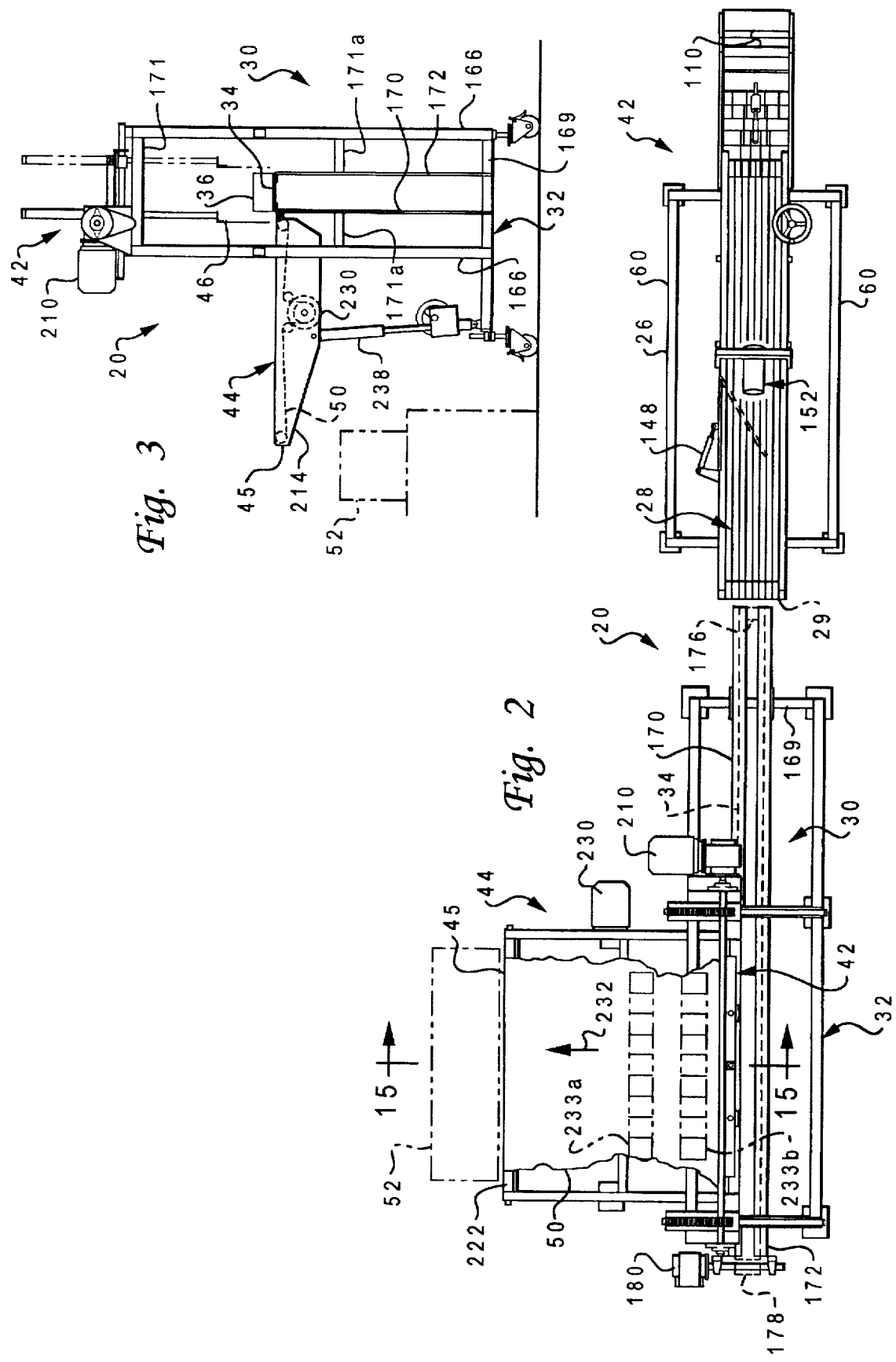

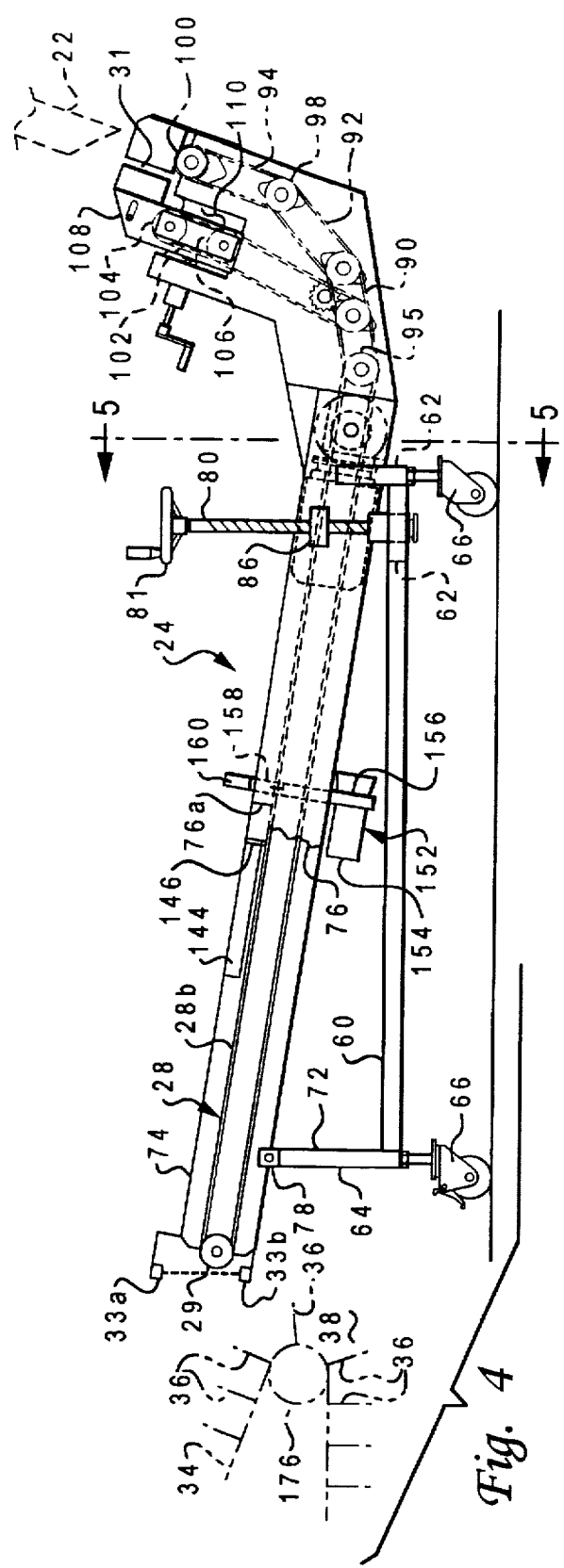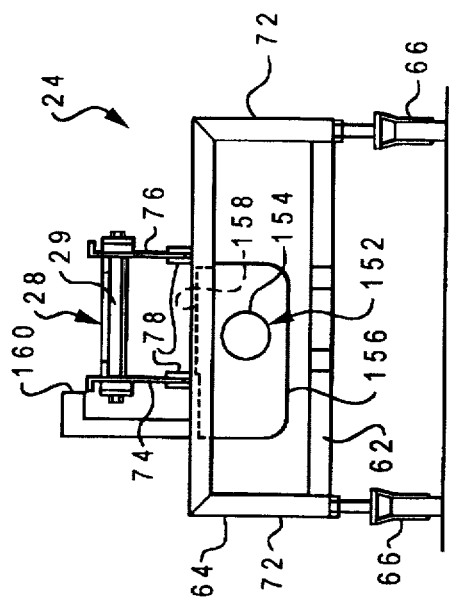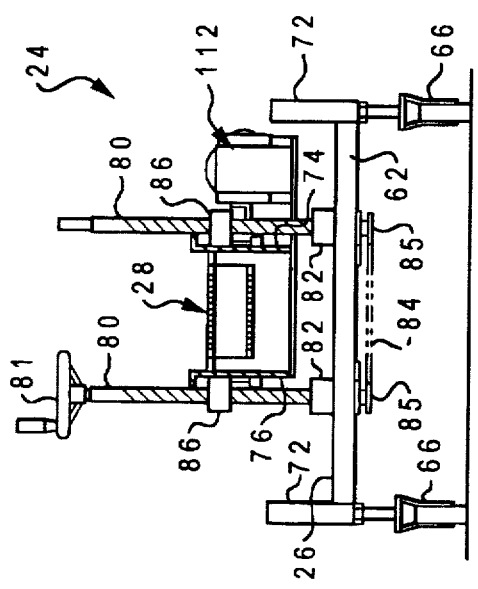

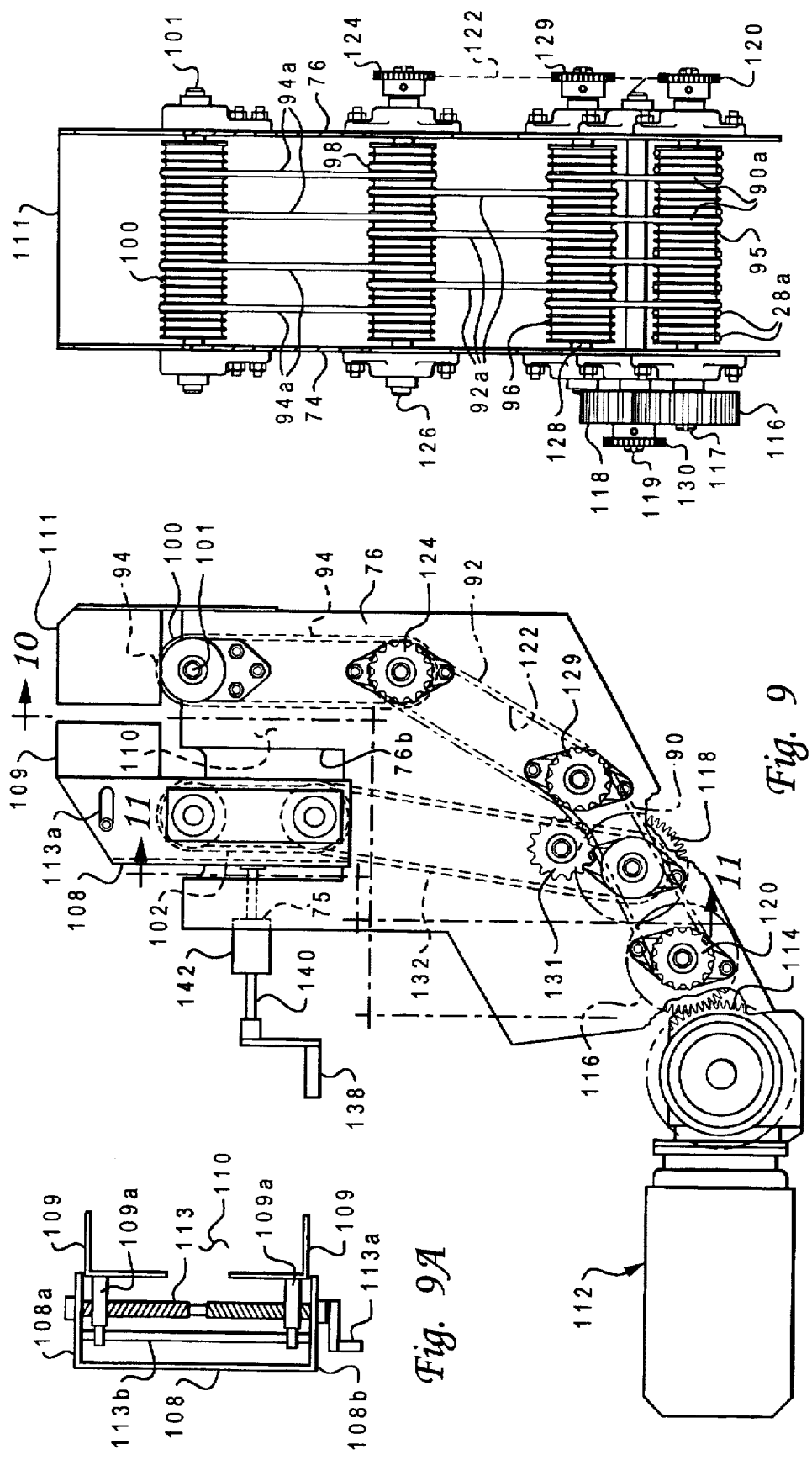

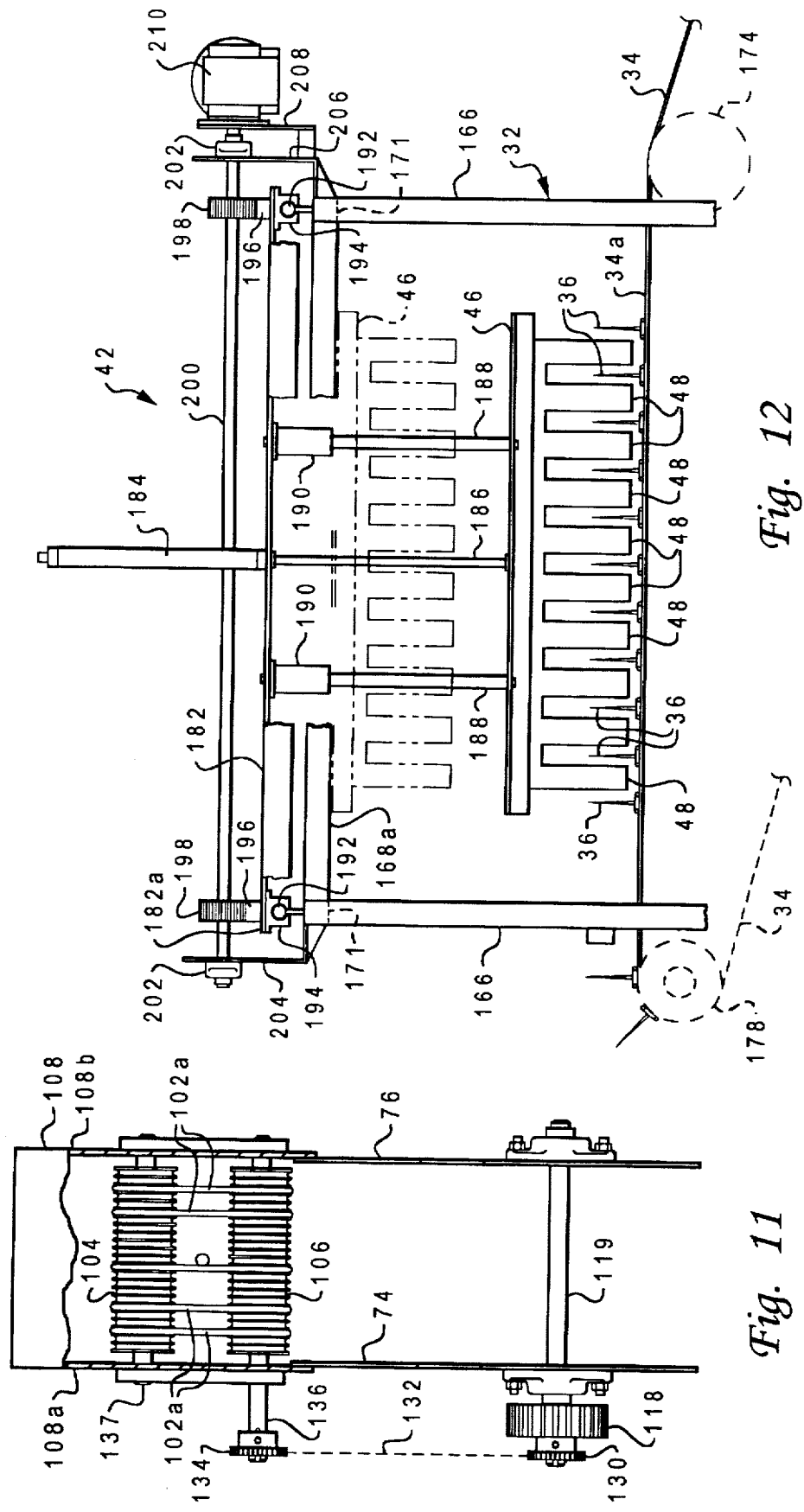

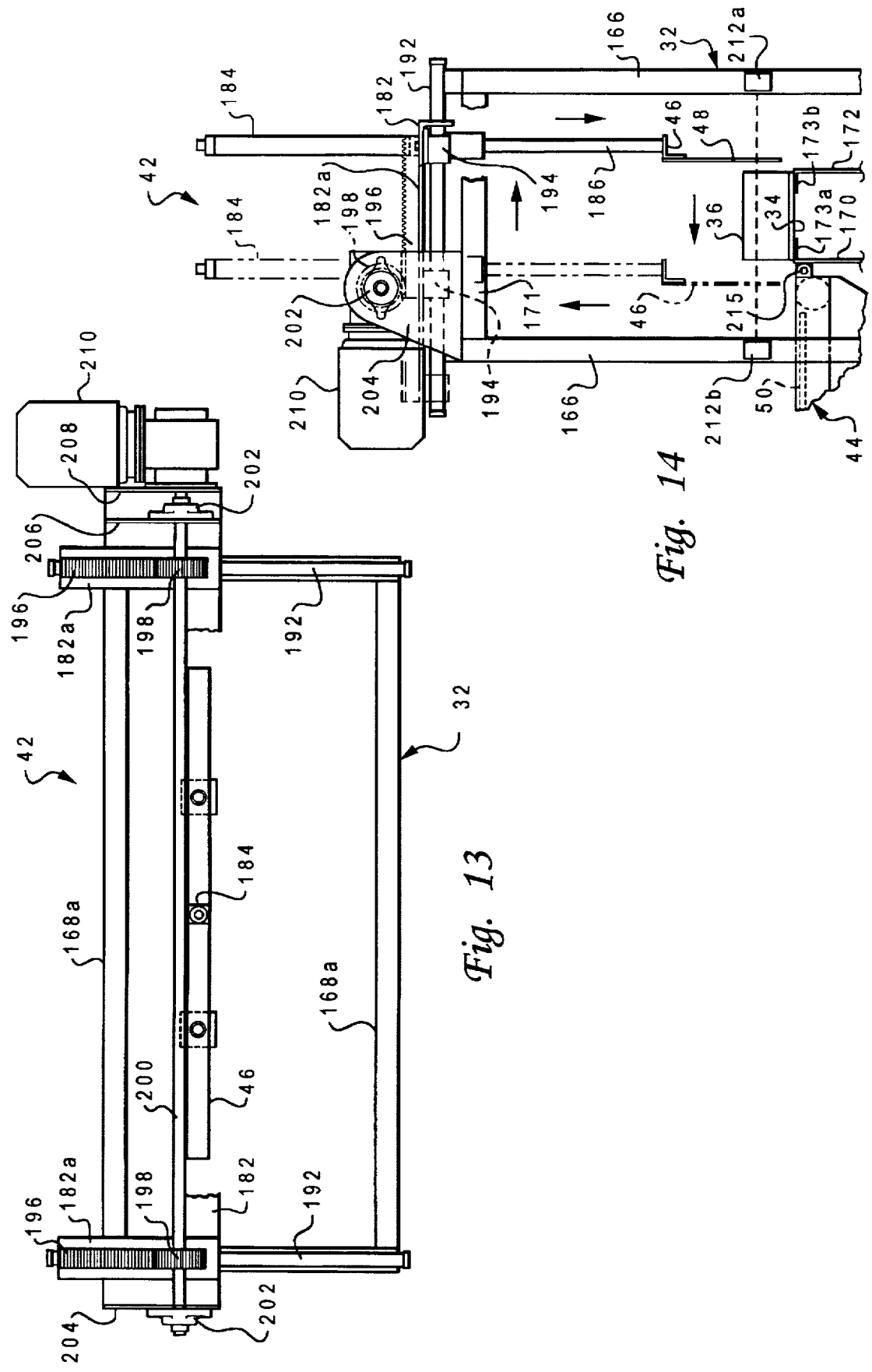

ARTICLE CONVEYOR AND COLLATOR SYSTEM AND METHOD

FIELD OF THE INVENTION

The present invention pertains to a multistage conveyor apparatus for conveying a predetermined number of articles for packing in containers, particularly packaged foods such as flexible bags of snack foods and the like.

BACKGROUND

Mass production methods for articles of manufacture, including packaged foods, seek ever increasing efficiencies with regard to the rate of production and packing for shipment while preventing such anomalies as an insufficient or excess number of articles or packages per shipping container, improperly marked packages, insufficiently filled or empty packages, and, in certain instances, articles or packages which are inadvertently attached to each other. In the food packaging industry, such as in the packaging of potato chips, corn chips and other snack foods, there has been a continuing need to increase the rate of production of these packaged items and to provide for shipment of the food packages in containers or cartons which will hold a precise, predetermined number of packages.

Equipment for conveying and collating the above-mentioned types of packages, in particular, should meet certain desiderata, including (a) portability and ease of reconfiguration due to changes in mass production techniques and material flow through a manufacturing or processing facility, (b) predetermined positioning of the packages so that they may be viewed by an inspector or operator for improper package formation, and improper stamping of indicia thereon, (c) controlling a precise number of packages for placement in a shipping container or carton, (d) eliminating empty or insufficiently filled or overfilled packages, (e) eliminating improperly attached packages, one to another, when the conveyor system receives the packages from the package filling and sealing machine, and (f) providing for conveying and collating articles at high rates.

Although conveyor systems have been developed which transport articles and which count articles for transfer to a position for loading the articles into a shipping carton, the above-mentioned desiderata have not been entirely satisfied with a conveyor system and method which will assure that all of these requisite parameters are met, particularly for packaged food products. It is to these ends that the present invention has been developed.

SUMMARY OF THE INVENTION

The present invention provides an improved article conveyor system, particularly useful for conveying and collating articles such as food packages being discharged from a high speed packaging machine, for example.

In accordance with one aspect of the invention, an improved article conveyor is provided which includes a first stage conveyor which receives plural articles, such as snack food packages, seriatim from a packaging machine and conveys the packages to a second stage conveyor which is operable to count a predetermined number of packages for transfer to a third conveyor.

The first stage conveyor is operable to orient the packages in a predetermined direction, convey the packages serially along the first stage conveyor and discharge the packages one at a time to the second stage conveyor. The first stage conveyor advantageously includes sensors for determining if two or more packages are attached to each other and a mechanism for ejecting such attached packages from the conveyor system. The first stage conveyor also includes means for ejecting unfilled or insufficiently filled packages from the conveyor system.

In accordance with another aspect of the invention, a conveyor system is provided for transferring packaged articles in such a manner that the packages may be inspected during the transfer process and a second stage of the conveyor system is operable to count a predetermined number of packages and transfer the predetermined number of articles to another conveyor or directly to a container or carton for shipment. The conveyor system also includes a transfer mechanism which is operable to effectively remove a predetermined number of articles laterally from a conveyor for packing the articles in a shipping container or the like, for example. The second stage conveyor is provided with an endless conveyor member having spaced apart upstanding partitions and the conveyor member is trained over a sprocket or roller at the article receiving end of the second stage conveyor in an arrangement with respect to the discharge end of a first stage conveyor in such a way that articles, such as food packages, are transferred more effectively from the first stage conveyor to pockets formed between the partitions of the conveyor member of the second stage conveyor with minimal chance of improper transfer or collision between the articles and the conveyor partitions.

In accordance with a further aspect of the invention, the conveyor system includes a conveyor stage which receives a predetermined number of articles from a previous conveyor stage and is operable to transfer the articles to a position wherein a collated row of articles may be transferred to a shipping carton or other handling or transport means laterally with respect to the direction of travel of the previous conveyor stage. The lateral conveyor includes a support mechanism for adjusting its working position for ease of collection and transfer of the collated articles by a human operator to a shipping or storage container.

The conveyor system of the present invention is also characterized by several advantageous features including a support frame arrangement which is adapted for ease of cleaning and movement of the conveyor system from one working position to another or for storage when not in use. The conveyor system includes controls which provide for precise counting of the number of articles being conveyed by a second stage conveyor to mechanism for transferring a predetermined number of articles from the second stage conveyor. The transfer mechanism has superior and reliable mechanical features which enable ease of removal of packages from the second stage conveyor.

The conveyor system of the present invention is particularly adapted for conveying and collating food packages received from a high speed packaging machine and the conveyor system is adapted to convey and collate packages at a high rate as compared with prior art conveyor systems. The conveyor system is also particularly adapted for conveying packages of snack foods such as corn and potato chips, pretzels and similar loosely packed food items which are packaged in quantity in flexible envelope or bag-like packages. However, the conveyor system may also be used to convey other types of discrete articles.

Those skilled in the art will further appreciate the above-mentioned advantages and features of the invention together with other superior aspects thereof upon reading the detailed description which follows in conjunction with the drawing.

BRIEF DESCRIPTION OF THE DRAWINGS

FIG. 2 is a plan view of the conveyor system shown in FIG. 1;

FIG. 3 is an end elevation of the conveyor system;

FIG. 4 is a side elevation of the first stage conveyor on a larger scale;

FIG. 5 is a view taken generally from the line 5—5 of FIG. 4;

FIG. 6 is a transverse end view of the discharge end of the first stage conveyor;

FIG. 9 is a detail side elevation of the drive mechanism for the first stage conveyor;

FIG. 9A is a top plan view showing adjustable article guide plates for the first stage conveyor;

FIG. 10 is a view of the drive mechanism taken from line 10—10 of FIG. 9;

FIG. 11 is a detail view of an adjustable guide conveyor for the first stage conveyor taken from line 11—11 of FIG. 9;

FIG. 12 is a side elevation of the second stage conveyor and transfer mechanism;

FIG. 13 is a top plan view of the transfer mechanism;

FIG. 14 is an end view of a portion of the second stage conveyor and the transfer mechanism;

DESCRIPTION OF A PREFERRED EMBODIMENT

Figure 1:
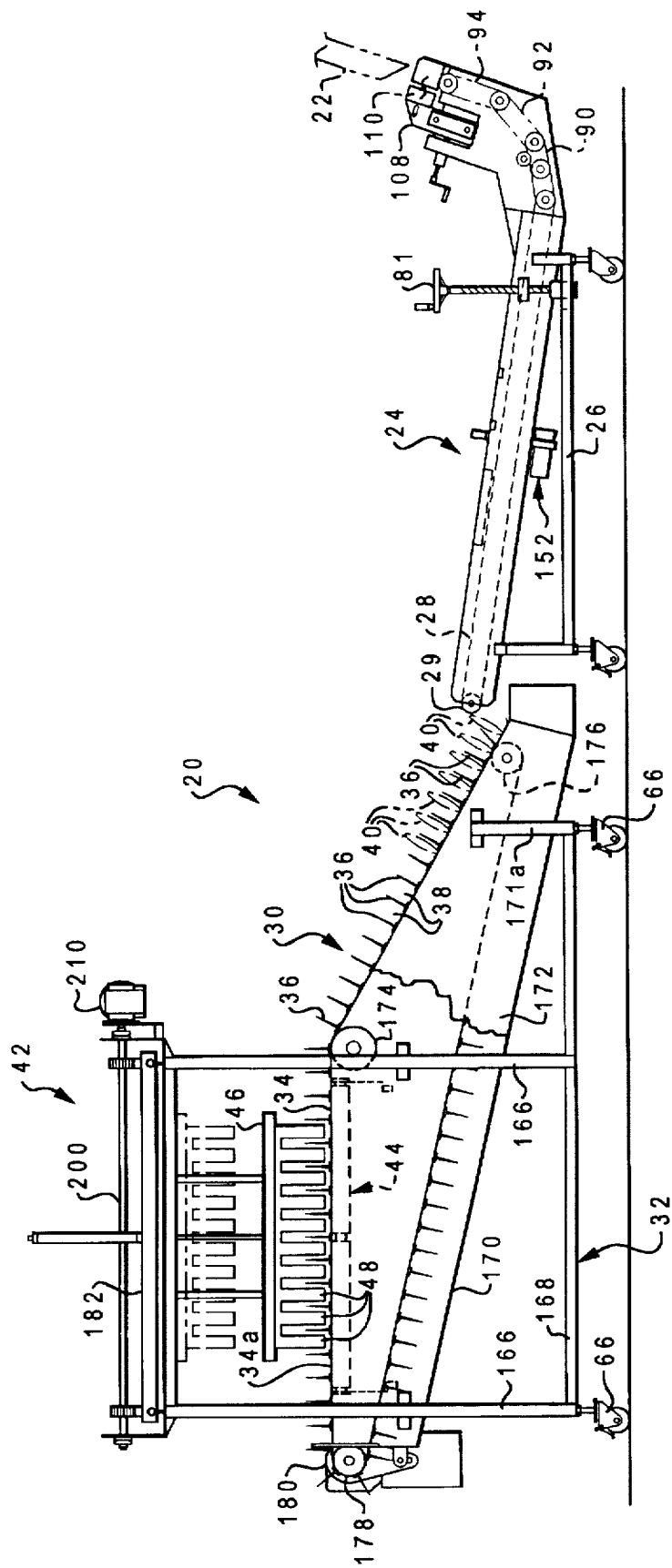
FIG. 1 is a side elevation of a conveyor system in accordance with the present invention.

In the description which follows, like parts are marked throughout the specification and drawing with the same reference numerals, respectively. The drawing figures are not necessarily to scale and certain features may be shown in generalized or somewhat schematic form in the interest of clarity and conciseness.

Referring to FIGS. 1, 2 and 3, there is illustrated a multistage conveyor system for conveying discrete articles, particularly packaged snack foods, including corn chips, potato chips and the like. Such food products are typically packaged in thermally sealed plastic envelopes or bags which are passed through a relatively high speed packaging machine capable of filling, sealing and discharging seventy-five to one hundred fifty packages per minute. The conveyor system illustrated in FIGS. 1 through 3 is generally designated by the numeral 20 and is adapted to be placed adjacent to a packaging machine of the type aforementioned and having a package discharge chute or guide 22, see FIG. 1. The package discharge chute 22 is adapted to discharge packages seriatim to a first stage conveyor 24 of the conveyor system 20, including a movable support frame 26. The first stage conveyor 24 includes an elongated flexible endless conveyor member 28 suitably supported for conveying packages between the discharge chute 22 of the packaging machine and a second stage conveyor 30 of the conveyor system 20. The second stage conveyor 30 is also mounted on a movable frame 32 and is adapted to be placed adjacent to the conveyor 24 to receive, serially, packages conveyed therealong by the conveyor member 28. The second stage conveyor 30 includes an endless conveyor member 34 having spaced apart, upstanding, transversely extending plate-like partitions supported thereon, each designated by the numeral 36. The partitions 36 form adjacent transversely extending slots 38, each adapted to receive a package 40, such as a flexible plastic thermally sealed bag filled with a relatively fragile food product such as corn or potato chips, for example. Several packages or bags 40 are shown in FIG. 1, each being disposed in the respective slots 38 by the conveyor 24 in a manner to be described in further detail herein.

The second stage conveyor 30 also includes a mechanism, generally designated by the numeral 42, supported on the frame 32 for transferring a predetermined number of packages from the conveyor member 34 to a third stage lateral conveyor, generally designated by the numeral 44 in FIGS. 2 and 3. The transfer mechanism 42 includes a movable rake member 46 having spaced apart tines 48, FIG. 1, which are operable to remove a package 40 from each slot 38 occupied by a package, and corresponding to the number of tines, by movement from a position to the right of the conveyor member 34, viewing FIG. 3, to the left across the conveyor member 34 to the position shown by the solid lines in FIG. 3 to deposit a predetermined number of packages 40 on the conveyor 44.

As shown in FIGS. 2 and 3, the conveyor 44 is characterized by an endless, flexible belt type conveyor member 50 which is operable to move a row of a predetermined number of packages 40 toward the distal end 45 of the conveyor 44 whereupon a human operator, not shown, may place the row of packages into a shipping container or carton 52, see FIGS. 2 and 3. The transfer mechanism 42 is operable to carry out repeated cycles of transferring packages 40 from the conveyor member 34 to the conveyor member 50 whereupon a predetermined number of packages are transferred with every cycle of movement of the rake 46 through the slots 38 of the conveyor member 34 so that successive rows of collated packages are deposited on the conveyor 44 and may be removed therefrom by suitable means, such as the aforementioned human operator, for placement in shipping container 52, FIGS. 2 and 3, or for other processing or transport operations.

Referring now to FIGS. 4 through 7, in particular, certain features of the first stage conveyor 24 are illustrated. The frame 26 includes spaced apart longitudinal frame members 60 interconnected to transverse frame members 62 at opposite ends of the members 60. An upstanding support bracket 64 is disposed at one end of frame 26, as shown. The frame 26 is supported on four spaced apart casterable wheel assemblies 66, see FIG. 8 also, which are adapted to support a jackscrew 68 engaged with a stationary nut 70 supported on a depending tubular column member 72 disposed at each corner of the frame 26 defined by an intersection of a member 60 with a member 62, as illustrated. Two of the column members 72 are part of bracket 64. The wheel assemblies 66 are also provided with suitable brake means 67, FIG. 8. for locking the frame 26 in a predetermined and adjustable elevated position thanks to the jackscrews 68 and cooperating nuts 70.

As shown in FIG. 6, the bracket 64 is operable to support parallel spaced apart frame plates 74 and 76 for the conveyor 24 which are pivotally secured to the bracket 64 by suitable pivot means 78. The opposite end of the frame 26 supports two spaced apart elevating jackscrews 80 which are supported for rotation in spaced apart bearing means 82 supported on an intermediate transverse frame member 62, as shown in FIG. 5, and drivingly engaged with each other through a suitable endless chain 84 and cooperable sprocket means 85 mounted on the lower end of each jackscrew 80, FIG. 5. The jackscrews 80 are engaged with suitable nut members 86 secured to the frame plates 74 and 76, respectively. The end of the conveyor 24 opposite the end which is pivotally supported by the bracket 64 may be selectively elevated or lowered by rotating a wheel 81 connected to one of the jackscrews 80, as shown in FIGS. 4 and 5.

The frame plates 74 and 76 support a series of endless conveyor members, including the conveyor member 28, and package feed conveyor members 90, 92 and 94, all interconnected to convey packages from the chute 22 toward the discharge end of conveyor 24. The conveyor member 28 is supported by a suitable grooved roller 29 disposed between and supported by frame plates 74 and 76 at the discharge end of the conveyor 24, as shown. A light source 33a and a photosensor 33b are mounted adjacent to roller 29, as shown in FIG. 4, for detecting the leading edge of a package 40 as it passes over the roller. The opposite end of conveyor member 28 is trained around a grooved roller 95 which also supports one end of conveyor member 90, see FIG. 10 also. A third grooved roller 96 is interposed between the frame plates 74 and 76 or suitable detachable extensions thereof and has both conveyor members 90 and 92 trained therearound. Fourth and fifth grooved rollers 98 and 100 are also interposed between and supported by the frame plates 74 and 76 for rotation to cause the conveyor members 28, 90, 92 and 94 to traverse a package from the package inlet end 31 of conveyor 24 to the discharge end at the location of roller 29.

The first stage conveyor 24 also includes an endless flexible package guide conveyor member 102 suitably mounted on spaced apart grooved rollers 104 and 106, which are supported on a frame 108 whose position relative to the conveyor member 94 may be adjusted to vary the width of a gap 110 between the conveyor members 102 and 94 in such a way that packages 40 or similar articles entering the gap are guided along the conveyors 94, 92 for entry onto conveyor members 90 and 28 properly oriented, end to end. In particular, it is desirable to orient the articles 40 in essentially the way they exit the packaging apparatus so that when the articles traverse the conveyor 30 they are standing upright wherein indicia on the packages or articles 40 and the condition of the articles can be visually inspected.

Referring briefly to FIGS. 9 through 11, drive mechanism for the conveyor members 28, 90, 92, 94 and 102 is shown in some detail. All of the conveyor members for the conveyor 24 are driven by a conventional electric motor/gear drive unit 112, see FIG. 9, having a right angle drive mechanism suitably drivably connected to an output gear 114 which is meshed with a gear 116, which in turn, is meshed with a gear 118. The gears 116 and 118 are mounted on and drivably connected to rotatable shaft members 117 and 119 which are supported on suitable bearings and extend between the frame plates 76 and 74, as illustrated. The grooved roller 95 is supported on and rotatable with shaft 117 and shaft 117 supports a chain sprocket 120 suitably keyed thereto and drivably engaged with an endless chain 122. Chain 122 is drivably engaged with a sprocket 124 keyed to a shaft 126. Shaft 126 supports the roller 98 for rotation therewith and is disposed on suitable bearings on the frame plates 76 and 74.

As further shown in FIG. 10, roller 100 is also suitably supported on and rotatable with a shaft 101 which is supported on suitable spaced apart bearings secured to the frame plates 74 and 76. A driven shaft 128 supports roller 96 for rotation therewith between frame plates 74, 76 and has a chain sprocket 129 keyed thereto for drivingly rotating the shaft. Chain 122 is trained over sprockets 120, 129 and 124 and an idler sprocket 131, FIG. 9, suitably mounted on frame plate 76.

Referring also to FIG. 11, shaft 119 supports a drive sprocket 130 for an endless chain 132, which is trained over a sprocket 134 suitably keyed to a rotatable shaft 136 supporting the grooved roller 106 for rotation therewith between opposed flanges 108a and 108b of frame 108. Roller 104 is mounted on rotatable shaft 137 also supported on frame 108 between flanges 108a and 108b. The conveyor member 102 is supported on frame 108 for movement toward and away from the conveyor 94 by a suitable mechanism including a manually rotatable handle 138, FIG. 9, connected to a jackscrew 140 which is threadedly engaged with a stationary nut 142 supported by the spaced apart frame plates 76 and 74 on a suitable transverse frame plate 75, see FIG. 9. Frame plates 74 and 76 include suitable recesses, one shown in FIG. 9 and designated 76a, to permit movement of frame 108. Suitable guide plates 109 and 111 form a channel at the entry of the gap 110 to assist in guiding packages 40 into the gap for orientation and conveyance by the conveyor members 94 and 102 and then by the conveyor members 92, 90 and 28.

The guide plates 109, in particular, may be adjustable to vary the lateral width of the gap 110 to accommodate packages of different widths. As shown in FIG. 9A, the plates 109 are mounted on suitable laterally movable but non-rotatable nut members 109a which are engageable with a rotatable threaded shaft 113 suitably mounted for rotation on the frame 108 and connected to a manual crank 113a. The nut members 109a may be slidably engaged with a stationary guide rod 113b to permit lateral translation of the nut members and the plates 109 toward and away from each other without rotation about the axis of the shaft 113.

Figure 7:
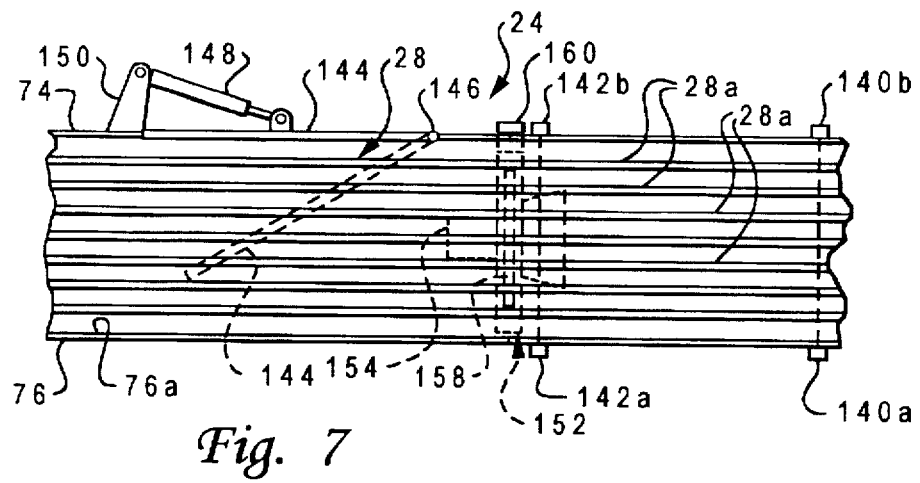
FIG. 7 is a partial plan view of the first stage conveyor showing the defective or attached package ejection mechanism and sensor arrangement.
Figure 8:
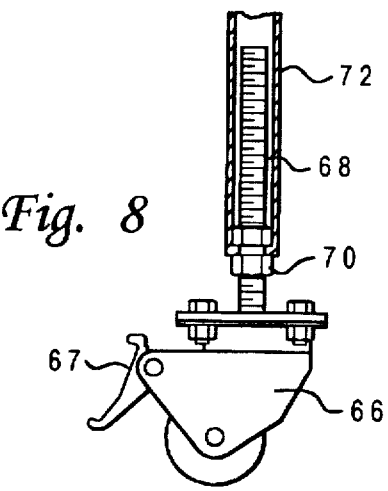
FIG. 8 is a detail view of one of the casterable wheel supports for the first stage conveyor frame.

The conveyor members 28, 90, 92, 94 and 102 are preferably characterized as so called ribbon conveyors comprising plural elongated elastomeric circular cross-section endless belts, as illustrated in FIGS. 7, 10 and 11. The number of belts making up each conveyor member is predetermined in accordance with the weight and size of the packages 40. As shown in FIG. 7 the conveyor member 28 may be made up of seven side by side conveyor strands or belts 28a. The conveyor member 90 is preferably made up of four spaced apart endless belts 90a, FIG. 10, the conveyor member 92 is made up of three spaced apart belts 92a and the conveyor member 94 is made up of four spaced apart endless belts 94a. The conveyor member 102 is also characterized by four or five spaced apart endless belts 102a, as shown in FIG. 11. The conveyor members 28a, 90a, 92a, 94a and 102a are all of a typed commercially available such as a type Volta RO available from Burrell Leder of Grand Prairie, Tex.

Accordingly, conveyor members 28 and 90 are positively driven by roller 95 through the gear motor 112 and gears 114 and 116. Conveyor members 92 and 94 are positively driven through the gear motor 112, and gear 114 by way of the gear 116, shaft 117 and chain 122. Finally, conveyor 102 is positively driven from the gear motor 112, and gear 114 by way of the gears 116 and 118, sprocket 130 and endless chain 132. In this way each of the conveyor members of conveyor 24 is driven by a chain or gear driven roller which minimizes the chance of slippage of the conveyors due to the accumulation of lubricious materials which are often found in the environment of food packaging and transport.

Referring further to FIGS. 4, 6 and 7, the conveyor 24, is provided with means for ejecting from the conveyor 24 and the system 20, packages which are contiguous with or connected to each other, unfilled or insufficiently filled. The frame plates 74 and 76 are adapted to support spaced apart sets of sensors 140a, 140b and 142a and 142b, FIG. 7. Sensors 140a and 140b preferably comprise a focused light source and a photosensor element, respectively. Sensors 142a and 142b comprise a similar combination. If the sensors 140a, 140b and 142a, 142b detect the presence of a traversing package along conveyor member 28 at the same time it is indicated that the package is too long, comprising two or more packages attached to each other, for example. This type of malformed package is not uncommon in high speed packaging and package sealing machines.

Accordingly, if two attached packages are sensed they are to be ejected from the conveyor 24. In this regard, a section of frame plate 74 is preferably cut away to provide a space for an elongated swingable gate 144, FIG. 7, mounted on a hinge or pivot member 146. Gate 144 is connected to a suitable actuator, such as a pneumatic cylinder and piston type actuator 148 suitably mounted on a bracket 150 supported on the conveyor 24. The actuator 148 is operable in response to a control signal to momentarily move the gate 144 to the alternate position shown in FIG. 7 to eject the malformed packages from the conveyor 24 by a way of a slot 76a formed in the frame plate 76 and delimited by an edge below the upper run 28b of the conveyor 28. In this way, as malformed or attached packages progress along the conveyor member 28 they may be ejected from conveyor 24 before reaching the second stage conveyor 30. The actuator 148 is controlled by a suitable control circuit to be described in further detail herein in response to a signal from sensors 140a, 140b and 142a, 142b to extend the gate 144 across the conveyor member 28 sufficiently to eject the malformed or attached packages and then retract immediately so that packages capable of being transferred to the conveyor 30 may progress along conveyor 24.

Another feature of the conveyor 24 is shown in FIGS. 4, 6 and 7 and is characterized by a motor driven low-pressure air blower, generally designated by the numeral 152, suitably supported by the frame plates 74 and 76 and including a drive motor 154 and a suitable impeller, not shown, disposed within a plenum 156. Plenum 156 is provided with a first air discharge port 158 disposed below the conveyor run 28b and an auxiliary air discharge port 160 disposed slightly above the conveyor run 28b and laterally spaced therefrom. During operation of the conveyor 24, the motor driven blower 152 is operated substantially continuously to discharge a thin planar stream of low pressure air upwardly, viewing FIGS. 4 and 6, to lift unfilled or insufficiently filled packages 40 off of the conveyor run 28b whereupon a stream of air emanating from the port 160 will blow the unfilled or insufficiently filled packages laterally off of conveyor member 28 so that these packages do not progress through the conveyor system 20. Alternate means, not shown, for removing insufficiently filled or unfilled packages may be utilized, such as a sensor engaged with conveyor run 28b and detecting deflection of the conveyor run due to the weight of a package as it passes there-over. Such a sensor would respond to an insufficient weight of a package sensed by the sensors 142a, 142b, for example, and actuate the gate 144 to eject the unfilled or insufficiently filled package from the conveyor 24.

Referring now to FIGS. 1 through 3 and 12 through 14, the frame 32 for the second stage conveyor 30 includes spaced apart upstanding column members 166, FIGS. 1 and 3, which are connected at their lower ends to longitudinal frame members 168 and 168a and transverse frame members 169 and 171 to form a generally rectangular box like frame. Spaced apart upstanding parallel frame plates 170 and 172 are supported on frame 26 by frame members 171a, FIGS. 1 and 3. The frame plates 170 and 172 provide support means for the conveyor member 34. The conveyor member 34 may be a type commercially available such as a type Uni-Lite-EP closed top belt available from Burrell Leder and is characterized by hingedly interconnected molded plastic plates having the upstanding partitions 36 secured thereto, respectively. Spaced apart idler sprockets 174 and 176, FIGS. 1 and 12, are rotatably mounted on and between frame plates 170, 172 and support the flexible conveyor member 34 trained thereover. A suitable drive sprocket 178 is drivably engaged with conveyor member 34 and is also supported on and between the frame plates 170, 172. Sprocket 178 is drivenly connected to a gearmotor and brake unit 180 of a type commercially available, such as from Eurodrive, Inc., Dallas, Tex., as their type SAF 42 DT71D4.

The motor unit 180 is operable to precisely position or index the conveyor member 34 as it receives respective ones of the packages 40 in its slots 38. In other words, the motor unit 180 may be instantaneously energized to move the conveyor member 34 a predetermined amount and then braked to arrest movement of the conveyor member so that the slots 38 are sequentially positioned adjacent the roller 29 of the conveyor 24 to receive packages 40, one in each slot, respectively. Each of the sprockets 174, 176 and 178 is mounted for rotation on suitable bearings, not shown, supported by the frame plates 170 and 172.

The frame plates 170 and 172 have opposed flange portions 173a and 173b, see FIG. 14, turned toward each other and operable for supporting the conveyor member 34, particularly as it traverses along a generally horizontal run 34a between the sprockets 174 and 178. The frame 32 is also supported on spaced apart casterable wheel assemblies 66, FIGS. 1 and 3, which are secured to jackscrews 68 in the same manner as the frame 26 so that the frame 32 may also be elevated and moved when desired, from one work site to another.

As shown in FIGS. 1 and 4, the package receiving end of the conveyor 30, which is essentially defined by the portion of the conveyor member 34 which is trained over sprocket 176, is disposed directly adjacent to the conveyor roller 29 for conveyor 24 wherein packages or bags 40 leaving the conveyor member 28 are received in a somewhat widened slot 38 as the partition plates 36 tend to separate from each other when the conveyor member 34 traverses around the sprocket 176. In this way the conveyor member 34 is operable in an advantageous manner to receive a package 40 with minimal risk of the package inadvertently hitting one of the partitions 36 instead of moving fully into a slot 38.

Referring further to FIGS. 12 through 14, the elongated rake 46 is supported on the frame 32 by a moveable support beam member 182 comprising an elongated channel or angle shaped member, for example. A double acting pressure fluid cylinder and piston type actuator 184 is supported on the member 182 and is connected to the rake 46 by way of its piston rod 186 for moving the rake 46 between a downwardly extended working position, shown by the solid lines in FIGS. 12 and 14, and a retracted position also shown by the alternate position lines in FIGS. 12 and 14. Spaced apart guide rods 188 are connected to the rake 46, as shown, and are slidably disposed in guide bushings 190 suitably secured to the support beam member 182.

Spaced apart and parallel linear bearing guide rods 192 are mounted on the frame 32 as shown in FIGS. 12 through 14 and support respective recirculating ball type linear bearing elements 194 which are suitably connected to and support laterally extending arms 182a on opposite ends of the member 182, see FIGS. 13 and 14. Spaced apart parallel gear racks 196 are secured to each of the arms 182a, as shown, and are engaged with respective pinions 198, FIGS. 12 and 13, each mounted on and secured for rotation with an elongated shaft 200. The shaft 200 is supported at its opposite ends on suitable bearings 202 which are secured to support members 204 and 206, respectively, of frame 32. A third frame member 208 on frame 32 is adapted to support a right angle drive electric gearmotor unit 210 also of a type commercial available such as a model SAP 32 DT 71D4 manufactured by Eurodrive, Inc.

The motor unit 210 is reversible and is operable to rotate the shaft 200 and the pinions 198 to effect linear reciprocating movement of the member 182 and the structure connected thereto, including the rake 46 and its actuator 184. Accordingly, the rake 46 may be moved from an at rest starting position shown in FIG. 14, wherein the rake is extended downwardly. Initially, the rake 46 is moved from right to left, viewing FIG. 14, to the position shown by alternate position lines in FIG. 14 to sweep packages 40 out of the slots 38 and onto the conveyor 44. The rake 46 is then retracted upwardly toward the member 182 and then the motor unit 210 is reversed to effect translation of the member 182 in the opposite direction to return the rake 46 laterally to its starting position whereupon it is again extended downward to its home or at rest start position shown in FIG. 14. The path of movement of rake 46 is indicated by arrows in FIG. 14. Actuation of the motor unit 210 to effect translation of the rake 46 and its support member 182, when the rake is extended, is carried out in timed relationship to movement of the conveyor member 34 so that the tines 48 will not engage the partitions 36. Suitable limits switches, not shown in FIGS. 12 through 14, may be disposed on the support member 182 adjacent to the gear racks 196 or the linear bearing rods 192 to control operation of the motor unit 210 to control timing and minimize over-travel of the member 182 and the rake 46 in either direction laterally with respect to the direction of travel of the conveyor member 34.

Referring further to FIGS. 12 and 14, the conveyor system 20 includes a sensor characterized by a light source 212a, and a photosensor 212b aligned therewith, both supported by the frame 32. As indicated in FIG. 14, the sensor elements 212a and 212b may be supported by respective ones of the column members 166 on opposite sides of the conveyor member 34 and in a position such that, as a partition member 36 passes between the sensor elements 212a and 212b, a signal is generated to the conveyor control system indicating a predetermined movement of the conveyor member 34 as well as indicating whether or not a slot 38 bounded by the sensed partition is occupied by an article that has failed to be transferred by the rake 46 to the conveyor 44.

Figure 16A:
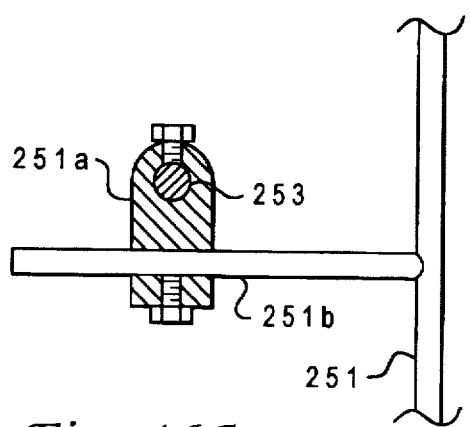
FIG. 16A is a detail view of one of the supports for the third stage conveyor guides.
Figure 15:
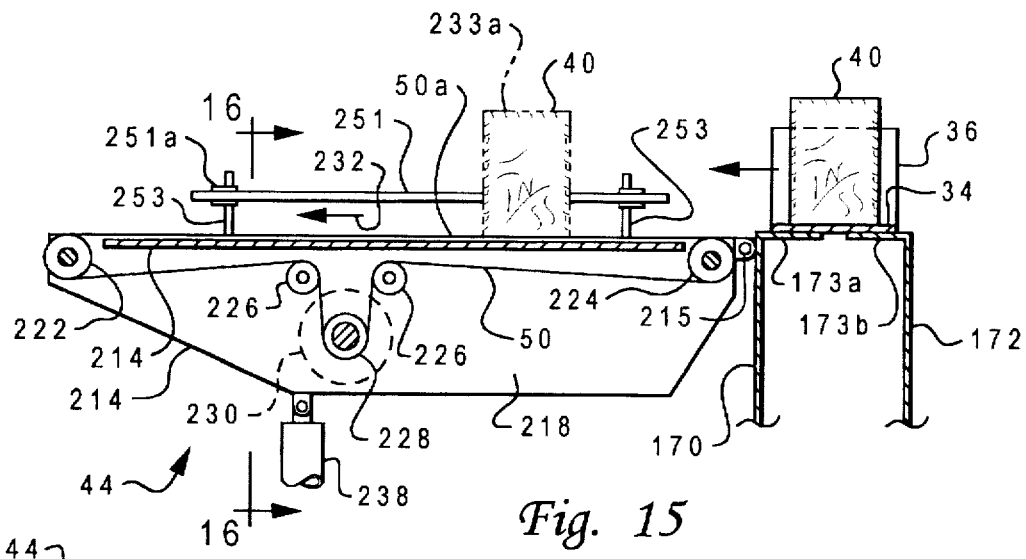
FIG. 15 is a view taken generally from the line 15—15 of FIG. 2 showing certain details of the third stage conveyor.
Figure 16:
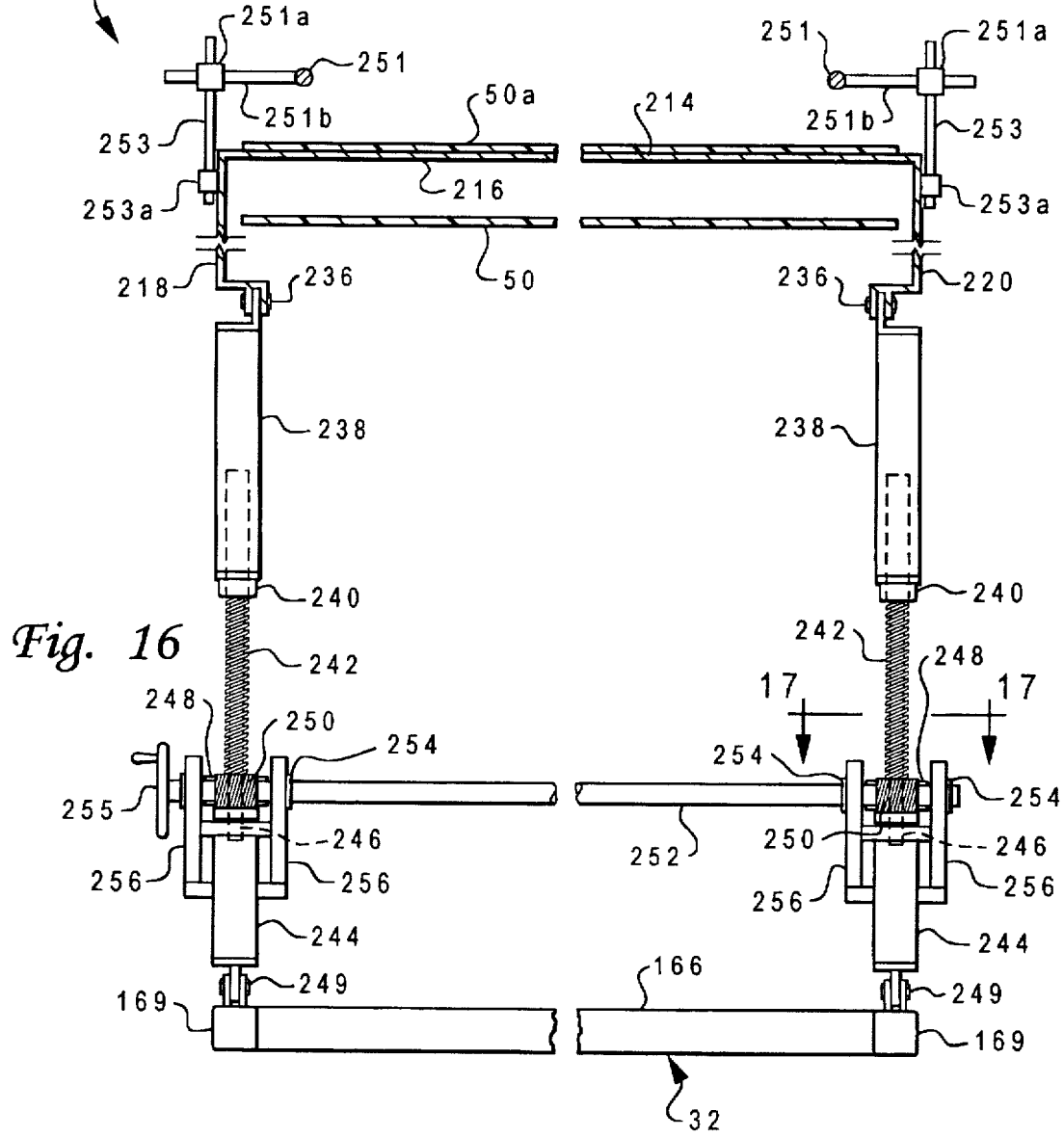
FIG. 16 is a view taken generally from line 16—16 of FIG. 15 showing the third stage conveyor elevating mechanism.

Referring now primarily to FIGS. 15 and 16, the conveyor 44 includes a frame member 214 characterized by a generally horizontal plate portion 216 and spaced apart, opposed depending flanges 218 and 220. Elongated rollers 222 and 224 are suitably supported for rotation by the frame member 214 between the flanges 218 and 220. Spaced apart idler rollers 226, see FIG. 15, are also supported between the flanges 218 and 220 and may include suitable adjusting mechanism, not shown, for adjusting tension in the endless flexible conveyor member 50 which is trained around the rollers 222 and 224 and over the rollers 226, as illustrated in FIG. 15. An upper run 50a of the conveyor member 50 is also supported by the transverse plate or web portion 216 of the frame member 214.

The conveyor member 50 is also trained around a drive roller 228, FIG. 15, also supported on suitable bearing means between the flanges 218 and 220 and drivenly connected to an electric drive motor 230, see FIGS. 2 and 3 also. The drive motor 230 is mounted on flange 218 and may be of the same type as motor 210. The drive motor 230 is operable to be controlled to translate the conveyor run 50a in the direction of arrow 232 in FIGS. 2 and 15, intermittently, to receive rows 233a and 233b of articles, such as packages 40, transferred from the conveyor member 34 to the conveyor member 50 by the rake 46. In other words, after a row of articles, such as bags or packages 40, has been transferred from the conveyor member 34 to the conveyor member 50 the motor 230 translates the conveyor run 50a a predetermined distance in the direction of arrow 232 and the motor 230 is then de-energized awaiting transfer of another row of articles from the conveyor member 34.

Referring further to FIG. 15, the frame member 214 is pivotally connected to the frame plate 170 at pivot means 215 and is operable to be supported in a predetermined elevated position for the comfort of an operator standing adjacent to the distal end 45 of conveyor 44 for loading rows of collated articles transferred by the conveyor member 50 into a suitable container or carton 52, FIGS. 2 and 3. As shown in FIG. 16, the frame member 214 includes opposed, spaced apart clevis parts 236 connected to the respective flanges 218 and 220 and forming pivot connections to respective tubular column members 238, each having a threaded nut 240 secured to a lower end thereof and threadedly engaged with an elevating jackscrew 242. Each jackscrew 242 is supported by an upstanding frame member 244 on suitable bearing means 246 for rotation relative to the frame member 244. Each frame member 244 is supported on and secured to a frame member 169, as shown in FIG. 16, by a clevis type pivot connection 249.

Figure 17:
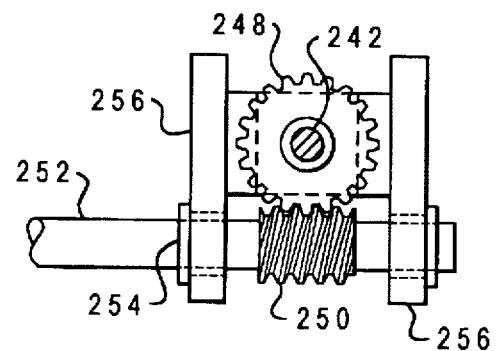
FIG. 17 is a detail view taken from the line 17—17 of FIG. 16.

Each jackscrew 242 includes a ring gear 248 suitably mounted on a lower end of the jackscrew and engaged with a worm gear 250, see FIG. 17, also supported for rotation on and with an elongated shaft 252. The shaft 252 is supported in spaced apart bearings 254 which are, in turn, supported on upstanding arm members 256 secured to respective ones of the frame members 244, as illustrated in FIGS. 16 and 17. The shaft 252 is connected to a suitable operator controlled wheel 255 whereby, in response to rotation of the shaft 252, the worm gears 250 rotate the ring gears 248 and the jackscrews 242 to adjust the position of the frame number 214 and conveyor member 50 about the pivot connection 215. In this way, the elevation of the conveyor run 50a may be adjusted to suit operating conditions and the comfort and efficient use of the system by a human operator standing adjacent discharge end 45 of the conveyor 44 for loading rows of collated articles, such as packages 40, into a container 52.

Referring further to FIGS. 15, 16 and 16A, the rows of packages 40, such as rows 233a and 233b, are preferably guided as they move along the conveyor run 50a by spaced apart, generally parallel guide members comprising rods 251 which are supported above the conveyor run 50a on spaced apart stanchions 253. The stanchions 253 are suitably supported by members 253a. FIG. 16, for vertical adjustment on and relative to the frame parts 218 and 220. The guide members 251 are supported on the stanchions 253 by suitable adjustable support parts 251a and by support beams 251b wherein the vertical and lateral position of the rods or members 251 with respect to conveyor run 50a may be adjusted to define the effective width of the conveyor run for supporting rows of packages 40.

Figure 18:
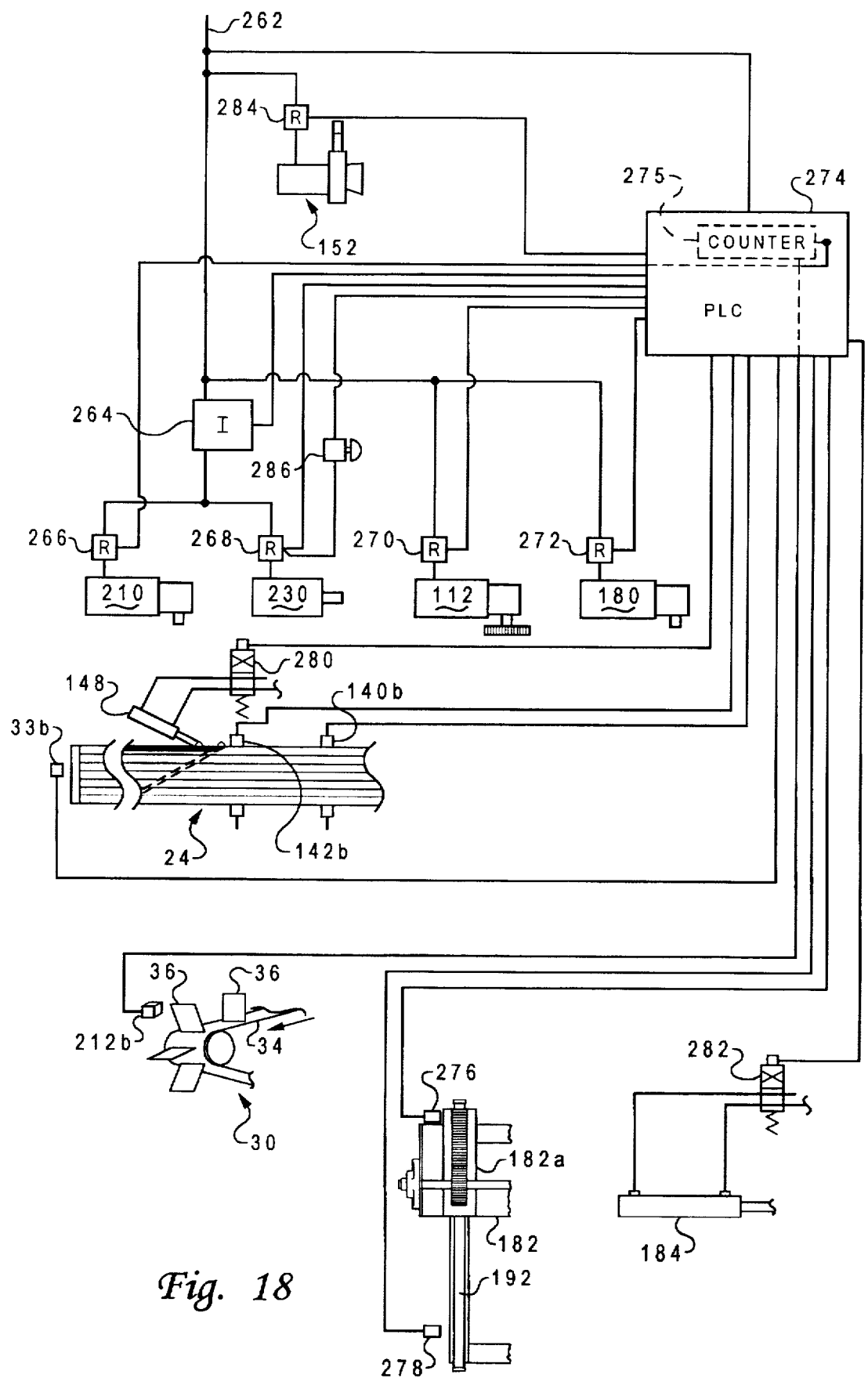
FIG. 18 is a schematic diagram showing certain features of a control system for the conveyor system shown and described herein.

Referring now to FIG. 18, there is illustrated a schematic diagram of a control system for the conveyor system 20. The control system is adapted to be connected to a source of conventional alternating current electrical power, not shown, via conductor means 262 which is connected to an inverter 264. Inverter 264 is operably connected to the motors 210 and 230 by way of suitable relays 266 and 268. The motors 112 and 180 are also operable to be in communication with the aforementioned power source by way of relays 270 and 272. A programmable logic controller, such as a type commercially available from Allen-Bradley, Milwaukee, Wis., as their model SLC-500 or from Toshiba as their model EX-40, is operably connected to the power source and to the relays 266, 268, 270 and 272. The controller 274 is also operably connected to sensors 33b, 140b, 142b, 212b and to spaced apart proximity sensors or switches 276, and 278 which are operable to sense the position of the support member 182 and the rake 46 with respect to the frame 32. The controller 274 is also operably connected to solenoid valves 280 and 282 for controlling operation of the actuators 148 and 184, respectively.

As shown in FIG. 18, the controller 274 is also operably connected to a relay 284 for controlling operation of the empty bag ejection blower 152. The controller 274 includes suitable counter means 275 which may be programmed to effect certain operating steps upon counting a predetermined number of input signals from the sensor 212b which senses the passing of a partition 36 on conveyor member 34, as previously described. Drive motor 230 for conveyor 44 may also be operated independent of the controller 274 by way of a manually actuable switch 286 which is advantageously located within easy reach of an operator standing at the distal end 45 of conveyor 44 to "jog" the conveyor, at will.

After a predetermined count is input to the counter 275, the slots 38 of conveyor member 34 are prefilled with packages 40 between a slot 38 which is to receive the next package from conveyor 24 and the first slot 38 which will be placed in position to have the rake 46 remove a package therefrom onto conveyor 44. When operation of the conveyor system 20 is commenced, motor 112 is operated substantially continuously and motor 180 is energized when sensor 33b detects the leading edge of a package 40 leaving the conveyor 28. In this way, as the conveyor member 34 begins movement, a slot 38 will move into position to receive the detected package. As soon as sensor 212b detects movement of a partition 36 past the sensor, a signal to the controller 274 deenergizes motor 180 and applies its brake to positively stop conveyor member 34. After a predetermined count sensed by sensor 212b, motors 210 and 230 are energized by signals from the controller 274 to start the rake 46 from its home position to move laterally across conveyor member 34 and sweep a row of packages 40 off of the conveyor member 34 onto conveyor member 50 which is now moving in the direction of arrow 232. Motors 210 and 230 are controlled through inverter 2654 to cause conveyor member 50 and rake 46 to move at substantially the same speed to minimize any staggering of packages 40 as they are transferred to conveyor member 50.

As soon as sensor or switch 276 detects translation of the rake 46 to its limit position to the left, viewing FIG. 3 or 14, motor 210 is deenergized and solenoid valve 282 is energized to cause actuator 184 to retract the rake 46 upwardly. After sensing movement of the rake 46 upwardly by a suitable sensor or a time delay, inverter 264 is controlled to effect reverse movement of the motor 210. However, motor 230 is not energized at this time through its relay 268 to prevent reverse movement of the conveyor 50. Motor 210 is energized in the reverse direction to move the rake 46 to the right, viewing FIGS. 3 and 14, until sensor 278 detects this movement whereupon the solenoid valve 282 is deenergized to allow the actuator 184 to reposition the rake 46 to its extended and home position preparatory to another operating cycle. At this time, counter 275 is reset to begin another count as soon as a package 40 is detected at sensor 212b.

If a malfunction occurs during the above-described operating cycle, motor 112 is deenergized to prevent accumulation of packages 40 at the loading point on conveyor member 34. Moreover, at any time during operation of the system 20, if malformed or attached packages are sensed by the sensors 140b and 142b, solenoid valve 280 is operated momentarily to cause actuator 140a to eject the malformed or attached package from conveyor 24. Solenoid valve 280 is deenergized after a suitable length of time to allow actuator 148 to return the gate 144 to its retracted position.

The operation of the conveyor system 20 is believed to be readily understandable to those of ordinary skill in the art from the foregoing description. However, briefly also, the system 20 is operable to convey packages 40 from a packaging machine having a discharge chute or guide means 22 whereupon a predetermined number of packages may be inspected during movement through the conveyor system 20 and placed in a shipping containing or carton 52. In operation, the conveyor 24 is substantially continuously operated through suitable control of the drive motor 112 while operating the motor driven blower 152 also, substantially continuously. As packages 40 are discharged into the gap 110 they are conveyed seriatim by the conveyors 94, 92, 90 and 28 toward the distal end of conveyor 28 represented by support roller 29. As the packages 40 pass the sensors 140a, 140b and 142a, 142b, if these sensors indicate a package length greater than the distance between the sensors, the gate 144 is actuated to eject the abnormal size package from conveyor member 28. Moreover, as the packages 40 pass over the upwardly flowing jet of air discharged from the motor driven blower 152, if these packages are empty or insufficiently filled they will be floated upwardly off the conveyor run 28b and ejected from the conveyor by the jet streams emanating from the blower outlet ports 158 and 160.

Sensor 33b senses a leading edge of a package 40 as it reaches the distal end of conveyor member 28 and transmits a signal to the system controller 274 to effect energization of motor 180 to index the conveyor member 34 a sufficient distance to enable positioning the conveyor members so that a slot 38 is operable to receive a package 40 between adjacent partition plates 36. Conveyor member 34 moves in the direction of arrow 34a in FIG. 1 until sensor 212b detects a partition 36 passing that sensor and transmits a signal to the controller 274 to effect deenergization of motor 180 and abrupt braking of the conveyor member 34. Sensor 212b is also operable to transmit a signal indicating if a slot 38 is occupied by a package or other obstruction indicating a malfunction of the system.

The above described operating cycle is continued until the predetermined count is achieved corresponding to the desired number of packages to be transferred from the conveyor member 34 to the conveyor member 50. When a predetermined package count is achieved by the operating cycle described above and the rake 46 is energized, conveyor 30 is momentarily de-energized during transfer of packages 40 from the conveyor member 34 to the conveyor member 50. When sensor 278 senses the home position of the member 182, the rake 46 is re-extended downwardly preparatory to making another sweep or transfer movement across the conveyor member 34. Conveyor 44 is energized simultaneously with operation of the rake 46 to sweep or transfer a predetermined number of packages 40 from conveyor member 34 to conveyor member 50.

The conveyor system 20 may be constructed using conventional materials and components for endless mechanical conveyor equipment, particularly such as used in the food packaging and processing industry. Conventional manufacturing processes and components not described in detail above may also be utilized in fabricating the conveyor system 20 and commercially available components may also be utilized in the control system.

Although preferred embodiments of a conveyor system, its components and method in accordance with the invention have been described in detail herein those skilled in the art will also recognize that various substitutions and modifications may be made without departing from the scope and spirit of the invention recited in the appended claims.

What is claimed is:

1. A conveyor system for transferring discrete articles, such as food packages and the like, said conveyor system comprising:

a first conveyor for receiving discrete articles, seriatim, said first conveyor including a first conveyor member for transporting said articles to a discharge end of said first conveyor, said first conveyor including a stationary frame supporting said first conveyor member between spaced apart support roller means and first drive motor means drivably connected to one of said support roller means for said first conveyor member;

a second conveyor including an endless second conveyor member supported on a frame which is stationary with respect to said frame for said first conveyor, member, said second conveyor member having a plurality of spaced partitions defining article receiving slots therebetween, respectively, said second conveyor member including a receiving end being disposed adjacent said discharge end of said first conveyor for receiving articles in said slots of said second conveyor member from said first conveyor member, said second conveyor including a drive motor drivably connected to said second conveyor member for positively indexing said second conveyor member a predetermined distance of movement corresponding substantially to one slot for receiving said articles seriatim in respective ones of said slots on said second conveyor member;

a third conveyor including a third conveyor member oriented to convey a plurality of articles in a direction transverse with respect to the direction of movement of said second conveyor member and for supporting a plurality of stacked side by side articles thereon; and a transfer mechanism including rake means operable to transfer a predetermined number of articles from said second conveyor member onto said third conveyor member to form at least one row of said articles on said third conveyor member.

2. The system set forth in claim 1 including:

at least one feed conveyor supported on said frame of said first conveyor and drivenly connected to said first drive motor means for conveying said articles to said first conveyer member.

3. The conveyor system set forth in claim 2 including:

a guide conveyor mounted on said frame of said first conveyor and adjacent to said one feed conveyor and defining a gap between said one feed conveyor and said guide conveyor for guiding said articles onto and through said one feed conveyor to said first conveyor member to maintain said articles in a predetermined orientation with respect to said first conveyor member.

4. The conveyor system set forth in claim 3 including:

a position adjusting mechanism supported on said frame for said first conveyor for changing the position of said one feed conveyor and said guide conveyor relative to means for discharging said articles to said first conveyor.

5. The conveyor system set forth in claim 1 including:

a frame for supporting said second conveyor member to form a generally horizontal run of said second conveyor member for positioning plural ones of said articles adjacent to said third conveyor.

6. The conveyor system set forth in claim 1 wherein:

said transfer mechanism includes a support member for said rake means, an actuator disposed on said support member for moving said rake means between extended and retracted positions with respect to said second conveyor member; and bearing means for supporting said support member for substantially linear reciprocating movement to effect movement of said rake means through said slots on said second conveyor member to transfer a predetermined number of packages from said second conveyor member to said third conveyor.

7. The conveyor system set forth in claim 1 wherein:

said third conveyor comprises a frame for supporting a third conveyor member for movement in a direction substantially transverse to the direction of movement of said second conveyor member, and a drive motor for said third conveyor member driveably engaged therewith for effecting movement of said third conveyor member in a predetermined manner to transfer plural side by side rows of said articles onto said third conveyor member at one end of a run of said third conveyor member and for movement toward the opposite end of said run of said third conveyor member.

8. The conveyor system set forth in claim 7 including:

means for adjusting the position of said opposite end of said third conveyor member to provide for an operator standing adjacent to said third conveyor to receive and remove one or more rows of articles from said third conveyor member, at will.

9. The conveyor system set forth in claim 7 including:

spaced apart guide members supported on said frame for said third conveyor for guiding said plural side-by-side rows of articles along said third conveyor toward said opposite end of said run of said third conveyor member.

10. The conveyor system set forth in claim 7 wherein:

said transfer mechanism includes drive motor means for moving said rake means to transfer said predetermined number of articles onto said third conveyor member; and said conveyor system includes control means for said drive motor for said transfer mechanism and said drive motor for said third conveyor member to effect movement of said rake means at substantially the same speed as said third conveyor member during transfer of a row of said articles onto said third conveyor member.

11. In a conveyor system for transferring discrete articles, such as food packages and the like, a conveyor unit including a frame, a first endless conveyor member mounted on said frame and including a generally horizontal conveyor run, said first conveyor member including spaced apart transversely extending partitions defining article receiving slots on said first conveyor member, respectively, sprocket means for supporting said first endless conveyor member for substantially reversing the direction of movement of said first endless conveyor member with respect to said frame whereby said partitions move relative to each other as said first endless conveyor member traverses said sprocket means to widen said article receiving slots for receipt of articles therein, respectively, as said articles are transferred seriatim to said conveyor unit, and means for depositing articles in said article receiving slots, respectively, when said article receiving slots are widened;

drive motor means for said first conveyor member for moving said first conveyor member incrementally to position a predetermined number of articles in a predetermined number of slots along said conveyor run;

an article transfer mechanism mounted on said frame including rake means operable to move a predetermined number of articles from said first conveyor member along said conveyor run, said transfer mechanism including support means for said rake means including a support member supported on linear bearing means disposed on said frame; and an actuator for moving said rake means between an extended position for engaging said articles in said slots to a retracted position for returning said transfer mechanism to a starting position of said rake means.

12. The conveyor system set forth in claim 11 including:

a second conveyor including an endless conveyor member supported on said frame for movement in a direction substantially transverse to the direction of movement of said first conveyor member.

13. The conveyor system set forth in claim 12 wherein:

said second conveyor member is drivenly connected to drive motor means; and said conveyor system includes means for adjusting the position of a discharge end of said second conveyor member to change the position of a run of said second conveyor member which is operable to carry one or more rows of said articles thereon from said first conveyor member.

14. A conveyor system for transferring discrete articles, such as food packages and the like, said conveyor system comprising:

a first conveyor for receiving discrete articles, seriatim, said first conveyor including a first conveyor member for transporting said articles to a discharge end of said first conveyor, said first conveyor including a frame supporting said first conveyor member between spaced apart roller means and first drive motor means drivably connected to one of said support roller means for said first conveyor member;

at least one feed conveyor supported on said frame of said first conveyor and drivenly connected to said first drive motor means for conveying said articles to said first conveyor member;

a guide conveyor mounted on said frame of said first conveyor and adjacent to said one feed conveyor and defining a gap between said one feed conveyor and said guide conveyor for guiding said articles onto and through said one feed conveyor to said first conveyor member to maintain said articles in a predetermined orientation with respect to said first conveyor member, said guide conveyor including an endless conveyor member supported on a support frame operable to be adjustably supported on said frame for said first conveyor and connected to position adjustment means for adjusting the position of said guide conveyor with respect to said one feed conveyor;

a second conveyor including an endless second conveyor member having a plurality of spaced partitions defining article receiving slots therebetween, respectively, said second conveyor member being disposed adjacent said first conveyor for receiving articles in said slots of said second conveyor member;

a third conveyor including a third conveyor member oriented to convey a plurality of articles in a direction transverse with respect to the direction of movement of said second conveyor member and for supporting a plurality of stacked side by side articles thereon; and a transfer mechanism including rake means operable to transfer a predetermined number of articles from said second conveyor member onto said third conveyor member to form at least one row of said articles on said third conveyor member.

15. The conveyor system set forth in claim 14 including:

drive means interconnecting said guide conveyor with said first drive motor means.

16. A conveyor system for transferring discrete articles, such as food packages and the like, said conveyor system comprising:

a first conveyor for receiving discrete articles, seriatim, said first conveyor including a first conveyor member for transporting said articles to a discharge end of said first conveyor;

sensor means disposed in proximity to said first conveyor member for sensing articles disposed too close to or attached to each other on said first conveyor member;

ejector means disposed adjacent said first conveyor member for ejecting articles disposed too close to or attached to each other in response to being sensed by said sensor means;

a second conveyor including an endless second conveyor member having a plurality of spaced partitions defining article receiving slots therebetween, respectively, said second conveyor member being disposed adjacent said first conveyor for receiving articles in said slots of said second conveyor member;

a third conveyor including a third conveyor member oriented to convey a plurality of articles in a direction transverse with respect to the direction of movement of said second conveyor member and for supporting a plurality of stacked side by side articles thereon; and a transfer mechanism including rake means operable to transfer a predetermined number of articles from said second conveyor member onto said third conveyor member to form at least one row of said articles on said third conveyor member.

17. A conveyor system for transferring discrete articles, such as food packages and the like, said conveyor system comprising:

a first conveyor for receiving discrete articles, seriatim, said first conveyor including a first conveyor member for transporting said articles to a discharge end of said first conveyor;

means for ejecting articles from said first conveyor member which have a weight less than a predetermined weight for said articles, respectively;

a second conveyor including an endless second conveyor member having a plurality of spaced partitions defining article receiving slots therebetween, respectively, said second conveyor member being disposed adjacent said first conveyor for receiving articles in said slots of said second conveyor member;

a third conveyor including a third conveyor member oriented to convey a plurality of articles in a direction transverse with respect to the direction of movement of said second conveyor member and for supporting a plurality of stacked side by side articles thereon; and a transfer mechanism including rake means operable to transfer a predetermined number of articles from said second conveyor member onto said third conveyor member to form at least one row of said articles on said third conveyor member.

18. The conveyor system set forth in claim 17 wherein:

said means for ejecting comprises a source of pressure air operable to flow a jet of pressure air across said first conveyor member to remove an article of insufficient weight from said first conveyor member.

19. A conveyor system for transferring discrete articles, such as food packages and the like, said conveyor system comprising:

a first conveyor for receiving discrete articles, seriatim, said first conveyor including a first conveyor member for transporting said articles to a discharge end of said first conveyor;

a second conveyor including an endless second conveyor member having a plurality of spaced partitions defining article receiving slots therebetween, respectively, said second conveyor member being disposed adjacent said first conveyor for receiving articles in said slots of said second conveyor member;

a third conveyor including a third conveyor member oriented to convey a plurality of articles in a direction transverse with respect to the direction of movement of said second conveyor member and for supporting a plurality of stacked side by side articles thereon; and a transfer mechanism including rake means operable to transfer a predetermined number of articles from said second conveyor member onto said third conveyor member to form at least one row of said articles on said third conveyor member, said transfer mechanism including a support member for said rake means, an actuator disposed on said support member for moving said rake means between extended and retracted positions with respect to said second conveyor member, bearing means for supporting said support member for substantially linear reciprocating movement to effect movement of said rake means through said slots on said second conveyor member to transfer a predetermined number of packages from said second conveyor member to said third conveyor, said bearing means comprising opposed linear bearing members supported on said frame for said second conveyor and above said second conveyor member, reversible drive motor means, gear means operably connected to and driven by said reversible drive motor means and gear rack means meshed with said gear means and supported on said support member for effecting reciprocating movement of said support member and said rake means.

20. The conveyor system set forth in claim 19 including:

control means for controlling said reversible drive motor means and said actuator for said rake means in timed relationship so that said rake means may be positioned adjacent said second conveyor member, sweep through said slots to remove packages in said slots from said second conveyor member, retract to a position disposed substantially clear of said second conveyor member, and translate in an opposite direction to a starting position for a subsequent operation to transfer plural ones of said articles from said second conveyor member to said third conveyor.

21. A conveyor system for transferring discrete articles, such as food packages and the like, said conveyor system comprising:

a first conveyor for receiving discrete articles, seriatim, said first conveyor including a first conveyor member for transporting said articles to a discharge end of said first conveyor;

a second conveyor including an endless second conveyor member having a plurality of spaced partitions defining article receiving slots therebetween, respectively, said second conveyor member being disposed adjacent said first conveyor for receiving articles in said slots of said second conveyor member;

a third conveyor including a third conveyor member oriented to convey a plurality of articles in a direction transverse with respect to the direction of movement of said second conveyor member and for supporting a plurality of stacked side by side articles thereon;

a transfer mechanism including rake means operable to transfer a predetermined number of articles from said second conveyor member onto said third conveyor member to form at least one row of said articles on said third conveyor member;

said third conveyor comprising a frame for supporting a third conveyor member for movement in a direction substantially transverse to the direction of movement of said second conveyor member, a drive motor for said third conveyor member drivably engaged therewith for effecting movement of said third conveyor member in a predetermined manner to transfer plural side by side rows of said articles onto said third conveyor member at one end of a run of said third conveyor member and for movement toward the opposite end of said run of said third conveyor member; and means for adjusting the position of said opposite end of said third conveyor member comprising spaced apart jackscrews connected to said frame for said third conveyor member and to a frame member of said conveyor system and means connected to said jackscrews for rotating said jackscrews to elevate or decline said frame for said third conveyor member to change the position of said run of said third conveyor member to provide for an operator standing adjacent to said third conveyor to receive and remove one or more rows of articles from said third conveyor member, at will.

22. In a conveyor system for transferring discrete articles, such as food packages and the like, a conveyor unit including a frame, a first endless conveyor member mounted on said frame and including a generally horizontal conveyor run, said first conveyor member including spaced apart transversely extending partitions defining article receiving slots on said first conveyor member, respectively;

drive motor means for said first conveyor member for moving said first conveyor member incrementally to position a predetermined number of articles in a predetermined number of slots along said conveyor run;

an article transfer mechanism mounted on said frame including rake means operable to move a predetermined number of articles from said first conveyor member along said conveyor run, said transfer mechanism including support means for said rake means including a support member supported on linear bearing means disposed on said frame, drive motor means mounted on said frame and operable to move said support member for said rake means in opposite directions, gear rack means connected to said support member for said rake means for translation therewith and gear means drivenly connected to said drive motor means and engaged with said gear rack means for translating said support member and said rake means in opposite directions substantially transversely with respect to the direction of movement of said first conveyor member; and an actuator for moving said rake means between an extended position for engaging said articles in said slots to a retracted position for returning said transfer mechanism to a starting position of said rake means.

* * * * *